Figure 1:
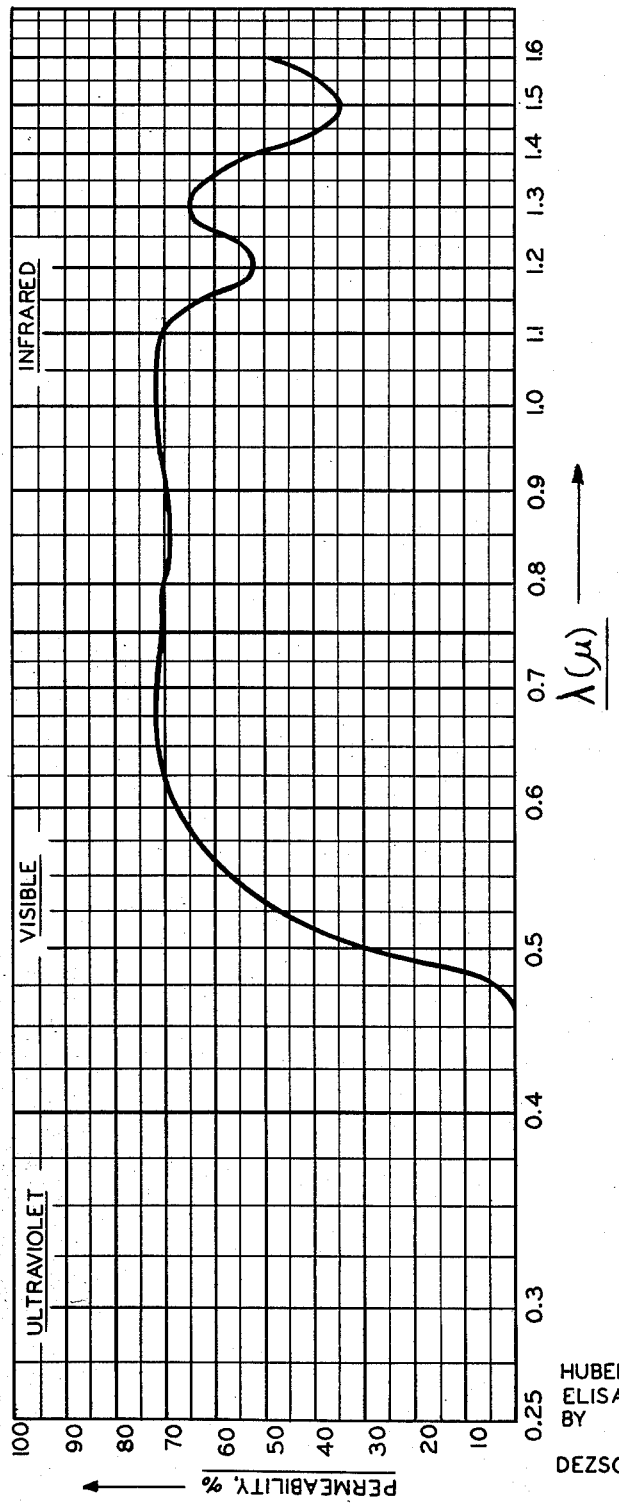

3,184,521
PROCESS FOR PREPARING A POLYESTER RESIN
Hubert Sauer and Elisabeth Kob, Letmathe, Westphalia, Germany, assignors to Rutgerswerke Aktiengesellschaft, Frankfurt am Main, Germany
Filed Aug. 7, 1962, Ser. No. 215,381
Claims priority, application Germany, Aug. 24, 1961, R 30,981
3 Claims. (Cl. 260—861)

It has been known that by polycondensation of unsaturated dicarboxylic acids with polyvalent alcohols polyesters are formed, which upon dissolution in an unsaturated solvent can be subjected to mixed polymerization with said solvent under the action of peroxide catalysts and thus converted into hardened condition. As unsaturated dicarboxylic acids primarily maleic acid and fumaric acid are used. In order to regulate the reactivity of such polyesters, it is conventional practice to incorporate in them also saturated dicarboxylic acids, for example phthalic acid or adipic acid.

The polyesters thus prepared are in their solution in the monomeric solvent throughout colorless to slightly yellowish more or less viscous liquids and their color remains almost unchanged during their hardening or curing in the presence of peroxide catalysts.

It has now been found that polyester resins, in which during polycondensation, in addition to the conventional unsaturated and saturated dicarboxylic acids, a small amount of p-ethyl-benzoylacrylic acid is incorporated by condensation, have an intensive reddish color. During hardening, the color of these resins changes to green-yellow and it has been found that in hardened condition this resin quantitatively absorbs ultraviolet radiation, in contrast to the known conventional polyester resins which are permeable by ultraviolet radiation. The resins embodying the present invention show this permeability by ultraviolet radiation also in articles which are molded from them and are reinforced by glass fibers, and therefore the polyester resins of the invention are novel products of high utility which can be utilized e.g. for the manufacture of filters for ultraviolet light.

It has been further found that p-methylbenzoylacrylic acid has also a high capacity of absorbing ultraviolet radiation when used in polyesters in the above described manner instead of p-ethyl-benzoylacrylic acid, although the absorbing effect of said methyl-derivative is not as quantitative as that of the ethyl-derivative.

In contrast to the above described compounds, benzoic acid and p-isopropylbenzoylacrylic acid do not affect the light-permeability of polyester resins.

It has been also found that in connection with the effect of absorbing ultraviolet radiation, it is not relevant which specific unsaturated and saturated dicarboxylic acids and what polyvalent alcohols are used for preparation of the polyesters. The selection of the unsaturated monomeric solvent has likewise no influence on the above described specific novel characteristic of the polyesters. Hardening or curing can be carried out in the presence of the conventional peroxide catalysts at ordinary room temperature, or at increased temperature.

The p-ethylbenzoylacrylic acid can be prepared by reacting maleic acid with ethylbenzol in the presence of $AlCl_3$ according to the Friedel-Crafts method (see Journal of the American Chemical Society 71, 1210–13). It has been found that the use of 0.05 mol of p-ethyl-benzoyl-acrylic acid for each mol of dicarboxylic acids is already sufficient in order to attain the effect of the invention. In carrying out the invention it is preferred to use 0.1 mol of the p-ethylbenzoylacrylic acid for each mol of dicarboxylic acid. Higher amounts are not necessary and, moreover, they cause break of the chain and, therefore, formation of resins of low molecular weight.

The following specific example illustrates a best mode for preparing the novel resins of the invention, to which the invention is not limited.

*Example*

A mixture of 2 mols maleic acid anhydride, 2 mols phthalic acid anhydride, 4.6 mols propylene-glycol-1.2 and 0.3 mol p-ethylbenzoylacrylic acid is esterified by heating up to 210° C., whereby the water formed in the reaction distills off. To the polyester thus prepared 0.01% hydroquinone is added and the polyester is then mixed with 40% of styrene. The resulting polyester resin has a reddish color and an acid number of 31. Curing of this resin with benzoylperoxide at 70° C. yields clear molded articles of greenish color. Examination of the latter with regard to light-permeability shows that this resin absorbs ultraviolet radiation practically quantitatively, as shown by curve 1 of the appended drawing. Curve 2 of the drawing illustrates the light-permeability of polyester containing p-methylbenzoylacrylic acid.

Figure 2:
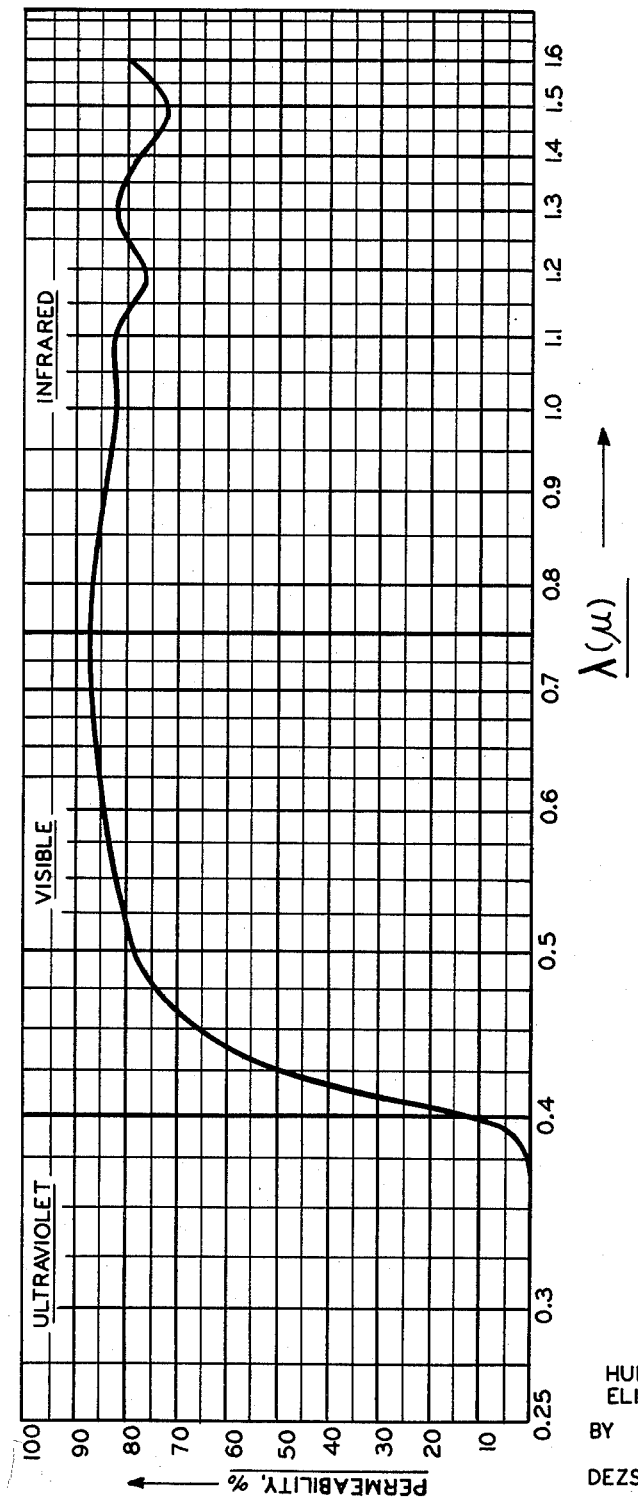

The appended drawings FIGURES 1 and 2 show light permeability curves for cured polyester resins which correspond to the above example and contain p-ethylbenzoylacrylic acid and p-methylbenzoylacrylic acid. The cured resin sample used in the tests of FIG. 1 had a thickness of 7.16 mm., and the sample used in the tests shown in FIG. 2 had a thickness of 1.70 mm. Examination of the light permeability was carried out with a beam of parallel light rays and the directed transparency was measured. The vertical axes in FIGS. 1 and 2 indicate the percent light permeability, while the horizontal axes indicate the wave lengths in $\mu$.

The ultraviolet range is usually estimated up to $0.4\mu$, the visible range from $0.4$–$0.75\mu$, while the infrared range extends above $0.75\mu$. It can be seen from the drawing that in FIG. 1 the permeability of the ultraviolet range is equal 0 and transmission of light starts at about $0.45\mu$. This means that small portions of the blue light are already absorbed within the visible range. It is known that these portions of the spectrum have an effect similar to that of the ultraviolet range, so that thereby a particularly effective protection is attained. This is brought about by the higher thickness of the resin layer in comparison with the resin used in the tests of FIG. 2.

However, it has been found—as shown by the curve of FIG. 2—that even at a thickness of 1.70 mm. of the resin layer an almost complete absorption of the UV light takes place. As a small rest of the UV-spectrum— between about 0.36 and $0.4\mu$—is still transmitted, in the use of plates of such thickness a certain natural color sight is still present.

The small differences of permeability in the visible range are caused by differences in the thickness of the resin samples. The differences occurring in the IR-range are irrelevant in the present case.

It will be understood that this invention is not limited to the specific details described in the specification and can be carried out with various modifications. For example, the invention can be applied to any specific unsaturated resin, as further examples of which the following are mentioned: any polymerizable polycondensation product of dicarboxylic acids with polyhydroxy alcohols, which products contain unsaturation, such as diethylene glycol maleate resin, ethyleneglycol maleate resin, diethylene glycol phthalic maleic resin prepared from phthalic acid, maleic acid and diethylene glycol; a resin prepared from 98 parts of maleic anhydride and 68 parts of ethylene glycol; a resin prepared from 106 parts of diethylene glycol and 98 parts of maleic anhydride; a resin prepared from 30.3 parts of diethylene glycol, 13.2 parts of maleic anhydride, and 21.7 parts of phthalic anhydride; a resin prepared from 20 parts of ethylene glycol, 29.4 parts of maleic anhydride and 3.3 parts succinic acid. The preparation of these unsaturated polyesters per se does not form part of the present invention and these resins are prepared by esterification of the ingredients in accordance with technique well known to those skilled in the art of unsaturated polyester resins. The unsaturated polyester resin and the co-polymerizable monomeric solvent may be used in any desired proportion. Polymerization of the unsaturated polyesters dissolved in monomeric liquids, particularly vinyl compounds, is carried out in conventional manner preferably in the presence of conventional organic peroxides and hydroperoxides. (See, for example, German Patent No. 967,265.) As further examples of the polymerizable monomeric solvents esters of vinyl alcohol, acrylic acid esters, methacrylic esters are mentioned. Other conventional monomeric solvent esters may also be used.

In carrying out the invention, polymerization and curing can be carried out in the temperature range of 20° to 160° C. The range in which the polyester is mixed with the co-polymerizable monomeric solvent is 20 to 60% by weight of the solvent based on the weight of the polyester. The organic peroxide is used in the polymerization and curing in conventional amount, e.g. 0.5 to 5% based on the weight of the material to be cured.

The products of the invention absorb ultraviolet light in the amount of 90 to 100%.

It will be understood that absorbtion of the ultraviolet light according to the invention takes place also in the absence of saturated carboxylic acids in the products of the invention.

The parts and percent are by weight if not otherwise stated.

What is claimed is:
1. A polyester resin consisting of the product of mixed polymerization and curing in the presence of a peroxide catalyst of a polyester dissolved in a monomeric liquid which is copolymerizable with said polyester; said polyester being the esterification product of (*a*) dicarboxylic acids selected from the group consisting of (1) unsaturated dicarboxylic acids and (2) mixtures of unsaturated and saturated dicarboxylic acids; (*b*) polyhydric alcohols and (*c*) 0.05–0.1 mol, for each mol dicarboxylic acid, of a benzoylacrylic acid derivative selected from the group consisting of p-ethylbenzoylacrylic acid and p-methylbenzoylacrylic acid.

2. A polyester resin as claimed in claim 1, in which the benzoylacrylic acid derivative is ethylbenzoylacrylic acid.

3. A polyester resin as claimed in claim 1, in which the benzoylacrylic acid derivative is methylbenzoylacrylic acid.

References Cited by the Examiner
UNITED STATES PATENTS

| | | | |
|---|---|---|---|
| 1,950,907 | 3/34 | Staud et al. | 252—300 |
| 2,962,533 | 11/60 | Hardy et al. | 252—300 |
| 3,120,564 | 2/64 | Milionis et al. | 252—300 |
| 3,125,597 | 3/64 | Wahl et al. | 252—300 |
| 3,126,414 | 3/64 | Spatz et al. | 252—300 |

OTHER REFERENCES

Journal American Chemical Society 71, 1210–13.

WILLIAM H. SHORT, *Primary Examiner.*

LEON J. BERCOVITZ, *Examiner.*